United States Patent [19]

Gill et al.

[11] Patent Number: 4,892,590

[45] Date of Patent: Jan. 9, 1990

[54] PRECIPITATED CALCIUM CARBONATE-CATIONIC STARCH BINDER AS RETENTION AID SYSTEM FOR PAPERMAKING

[75] Inventors: Robert A. Gill, Bethlehem, Pa.; Nigel D. Sanders, Somerville, N.J.

[73] Assignee: Pfizer Inc., New York, N.Y.

[21] Appl. No.: 202,175

[22] Filed: Jun. 3, 1988

[51] Int. Cl.$^4$ ............... C08L 91/00; D21D 3/00
[52] U.S. Cl. ................... 106/214; 106/464; 106/468; 162/175
[58] Field of Search ............ 106/464, 214, 468; 162/175

[56] References Cited

U.S. PATENT DOCUMENTS

| | | | |
|---|---|---|---|
| 3,245,819 | 4/1966 | Eberts | 106/464 |
| 3,940,550 | 2/1976 | Delfosse | 106/464 |
| 4,367,207 | 1/1983 | Vanderheiden | 423/432 |
| 4,799,964 | 1/1989 | Harvey et al. | 106/464 |

Primary Examiner—Theodore Morris
Attorney, Agent, or Firm—Peter C. Richardson; Trevor J. Lumb; Albert E. Frost

[57] ABSTRACT

A two component binder system comprising a highly dispersible, high specific surface area precipitated calcium carbonate (colloidal PCC) and a cationic starch, especially a cationic potato starch, for improving filler retention, opacity and strength during papermaking.

4 Claims, No Drawings

PRECIPITATED CALCIUM CARBONATE-CATIONIC STARCH BINDER AS RETENTION AID SYSTEM FOR PAPERMAKING

BACKGROUND OF THE INVENTION

This invention relates to papermaking processes. More specifically it relates to a binder system comprising a highly dispersible, high specific surface area calcium carbonate (colloidal PCC) and a cationic starch and the use of said system to produce paper having improved levels of retention of fillers, and improved strength and opacity.

In its efforts to produce high quality paper at the lowest possible price and to minimize environmental problems associated with disposal of the large volumes of waste chemicals resulting from paper manufacture, the paper industry has resorted to a variety of approaches. These include the use of lower quality pulps and/or the use of mineral fillers as substitutes for cellulose fibers. However, such approaches tend to reduce the strength, filler retention, dry brightness and other properties of the resulting paper, often with no beneficial effect upon environmental problems; and, of course, no economic advantages.

Attention is directed to Volume 16 of the KirkOthmer "Encyclopedia of Chemical Technology", pages 768–825 (1981), John Wiley & Sons, N.Y., for a summary of paper making technology, including reference to precipitated calcium carbonate as a filler in paper making.

Fillers are added to the pulp slurry during the paper making process to improve various properties such as softness, smoothness, brightness and opacity. Typical fillers are titanium dioxide, calcium carbonate, talc, synthetic silicates and clays such as kaolin and bentonite. As regards fillers in general, and calcium carbonate in particular, their retention; i.e., filler retention, is a function of their particle size, specific surface area, surface charge and specific gravity. Calcium carbonate, more specifically precipitated calcium carbonate (PCC), is enjoying increasing use in the paper industry as a filler as a result of the development of on-site PCC satellite plants; i.e., plants which produce PCC at or close by the paper mill in which it is to be used, making use of the carbon dioxide produced by the paper mill to convert calcium hydroxide to PCC.

In order to improve operation of the paper making machine and to improve the quality of the paper, various chemicals, generally referred to as processing aids are added to the paper. These include retention aids, flocculants, drainage aids, defoamers and slimicides. Retention aids are used to improve filler retention in the papermaking process by coflocculating the filler with pulp fibers and fines. Typical retention aids are amino or quaternary ammonium group containing polymers such as condensation polymers of diethylenetriamine-adipic acid polyamide which are treated with epichlorohydrin and ammonia- or dimethylamine-epichlorohydrin condensates and polyacrylamides (PAM). However, PAM retention aids are shear sensitive, can over flocculate a sheet causing poor formation and reduced drainage on the paper machine wire resulting in reduced productivity.

Starches are used in the papermaking process to improve dry strength of the paper. Also used are modified starches especially those having tertiary amino or quaternary ammonium groups and which are cationic in nature.

Recent developments in the paper industry which tend to overcome the above-mentioned deficiencies involve the use of binder systems such as combinations of anionic retention agents, e.g. polyacrylamides, and cationic starch. The most recent development as regards binder systems comprises a combination of cationic starch and anionic colloidal silicic acid. Such binder systems are described in U.S. Pat. Nos. 4,385,961 and 4,388,150, issued May 31, 1983 and June 14, 1983, respectively. While these binder systems, particularly those comprising cationic starch and anionic colloidal silicic acid, result in paper having improved filler retention and dry strength, relative to paper made in the absence of said systems, they do not enhance the opacity of the finished paper because of over flocculation of the filler and generally increase the cost of papermaking.

SUMMARY OF THE INVENTION

It has now been found that an anionic/cationic system comprising colloidal PCC in combination with a cationic starch forms an efficient binder system which improves filler retention, permits a reduction in the cellulosic fiber content of the paper and/or a reduction in the quality of the cellulosic fiber used, improves the opacity of the paper, and can be used in smaller amounts than those required for an anionic colloidal silicic acid/cationic starch system. Additionally, the colloidal PCC/cationic starch system of this invention is less sensitive to changes in ratios of colloidal PCC and cationic starch than is a colloidal silicic acid/cationic starch system. The herein described system permits the addition of up to 50% more filler to paper than is possible using polyacrylamide (PAM) with no reduction in strength. It enables the papermaker to not only improve current performance but to do so at a lower cost than is possible with other two component systems.

DETAILED DESCRIPTION OF THE INVENTION

The binder system of this invention comprises two components; namely, a highly dispersible, high specific area precipitated calcium carbonate (PCC) and a cationic starch. The calcium carbonate component is anionic and colloidal in nature. When used in a paper making process in the presence of a cationic starch it maximizes filler retention, improves drainage, formation and optical properties while maintaining acceptable strength characteristics in the finished paper.

A PCC particularly useful in the present invention is prepared by the process described herein. It comprises introducing carbon dioxide into an aqueous slurry of calcium hydroxide at a temperature of from 7° C. to 18° C. The slurry contains from about 0.02 to 1.0 weight percent, based on the calcium carbonate equivalent of the calcium hydroxide in the reaction slurry, of an anionic organopolyphosphonate polyelectrolyte and from 0 to 10 weight percent of aluminum sulfate octadecahydrate. The introduction is continued until precipitation of the calcium carbonate is substantially complete. The process to this point is that of U.S. Pat. No. 4,367,207, issued Jan. 4, 1983, but differs in that the slurry may also contain aluminum sulfate octadecahydrate. It is then heat aged to reduce the surface area and to increase dispersibility, then treated with an anionic dispersant, preferably an inorganic polyelectrolyte and more preferably sodium triphosphate or sodium hexametaphosphate. The calcium carbonate thus prepared is a highly dispersible, finely divided (colloidal) precipitated calcium carbonate. It carries a negative charge (zeta potential = −10 to −60 mv when suspended in deionized water at 1000 ppm total solids).

The aging step is carried out by heating the slurry at a temperature of from about 40° C. to about 90° C., most preferably at 60° C. and at a pH of 9–11, most preferably at pH 10, for a period of time sufficient to reduce the surface area of the precipitated calcium carbonate by about one-half and to increase dispersibility. The time, of course, is dependent upon the temperature. However, in general, periods of from about 0.25 to about 4 hours, preferably 0.5 hour, are adequate over the temperature range mentioned above.

To the aged slurry is then added, with stirring, the anionic dispersant in quantity sufficient to achieve a zeta potential of from −10 to −60 mV, preferably −20 to −40 mV. In the case of the favored polyphosphate dispersants this amounts to from about 2% to 20% by weight of precipitated calcium carbonate.

PCC having a surface area of from about 10 to 200 $m^2/g$ is useful in the binder system of this invention. However, PCC having a surface area of from about 50 to 150 $m^2/g$ is favored and that having a surface area of from about 50 to 90 $m^2/g$ is preferred.

The highly dispersible state of the colloidal PCC is demonstrated by the photon correlation spectrum of a freshly sonicated suspension which indicates a narrow particle size distribution with a mean particle diameter of 0.05–0.5 $\mu$m in general, and 0.1–0.3 $\mu$m for the most preferred material.

The cationic starch can be derived from any of the commonly available sources of starch producing materials, such as potatoes, corn, wheat and rice. A potato derived starch is favored, especially one in which the degree of substitution is between 0.10% and 0.50%. The preferred cationic potato starch is one made cationic by reaction with 3-chloro-2-hydroxypropyl trimethylammonium chloride to a degree of substitution of from 0.20% to 0.40%.

The ratio of PCC:cationic starch ranges from about 2:1 to 1:20. On a dry weight basis, the amount of cationic starch to pulp can vary from about 0.5% to 1.5% (dry weight) dry weight of pulp. The preferred range is 1.0% to 1.5%.

In an actual papermaking operation the filler would be added to the system at the blend chest. The colloidal anionic PCC would be added at the stuff box and the cationic starch would be added before the fan pump. However, total optimization would depend on the approach flow system associated with each specific papermaking machine.

In the Britt Jar retention and handsheet studies presented herein a standard 75% hardwood/25% softwood pulp stock was used. As filler, 20% by weight of precipitated calcium carbonate known as Albacar 5970 or Albacar HO, available from Pfizer Inc., assignee of this invention, was used. The experiments described were conducted in a Dynamic Drainage Jar ("Britt" Jar) available from Paper Research Materials, Inc. of Syracuse, N.Y. The percent of fines, fibers which pass through round holes 76 microns (125 P) in diameter, and the percent filler retained when using various retention aid components was determined.

Handsheet Studies

A handsheet experiment simulating high machine speed and shear conditions was performed in the laboratory by introducing turbulence and shear with a Britt Dynamic Drainage Jar and then forming handsheets on the Formax Sheet Former. This experiment determined first pass filler retention, pigment scattering coefficients, pigment absorption coefficients, corrected TAPPI opacity, TAPPI brightness, Scott internal bond, Taber stiffness, and % $CaCO_3$ values of handsheets made with Albacar HO Standard Filler Pigment available from Pfizer Inc. as the only filler pigment at theoretical filler loading levels of 8%, 24% and 40%. The experiment compares the effects made upon these sheet properties by the PCC/cationic starch system of this invention to colloidal silicic acid/cationic starch at ratios of 4 parts cationic starch component to 1 part anionic colloidal silica or colloidal PCC and at 10 parts cationic starch component to 1 part anionic colloidal silica or colloidal PCC. Comparison was against Percol 175, a typical high molecular weight cationic polyacrylamide (available from Allied Colloids, Fairfield, N.J.) system loaded at 1 lb/ton.

In the first phase of the experiment, colloidal silicic acid was compared with colloidal PCC at ratios of 4 and 10 parts cationic potato starch to 1 part inorganic component (i.e., silicic acid or PCC). The filler loading levels necessary to achieve 8%, 24% and 40% filler loading were held constant. The results indicate that the colloidal PCC/cationic starch system increases optical and strength properties of handsheets when made under high shear conditions to a greater extent than does colloidal silicic acid/cationic starch. Both systems exhibited equal sheet brightness. Although the PCC system exhibited a slight decrease in retention, this was offset by increased TAPPI opacity, pigment scattering, Scott internal bond, and Taber stiffness values. The results indicate that the PCC system is superior to typical polymeric retention aids such as Percol 175 with respect to retention properties, internal bonding strength and stiffness. Percol 175 surpasses both the PCC/cationic starch and silicic acid/cationic starch systems optically but does not exhibit their strength or retaining potential.

General Procedure

Albacar HO Standard Filler was the only filler used. It was made down to 20% pigment solids and dispersed on a roll mill for 2 hours. Other additives were a heat-aged colloidal PCC treated with 3% sodium triphosphate ($Na_5P_3O_{10}$) with a surface area of 64 $m^2/g$, a mean particle diameter of 0.2 $\mu$m and a zeta potential of −25.1 mV and BMA, a 5 nm anionic colloidal silica (Eka AB, S-445 01, Surte, Sweden). Both of these materials were made down to 0.5% concentration and dispersed on a roll mill for two hours. The colloidal PCC was dispersed for 15 seconds prior to its addition by means of an ultrasonic probe. Both of these materials are anionic and function as a part of a co-binder system with BMB cationic starch having a degree of substitution of 0.35% (available from Eka AB, S-445 01, Surte, Sweden). The cationic starch solution (0.5% concentration) was prepared by boiling it in dimineralized water for 30 minutes, cooling to room temperature, and adjusting the concentration with dimineralized water. Percol 175, a high molecular weight cationic polyacrylamide was also evaluated for its retaining properties. A 0.05% concentration of it was prepared by dispersing it, in dimineralized water, for two hours. In this experiment, the cationic addition level utilizing either the starch or Percol 175 was held constant at 1.0% (20 lbs/ton) or 0.05% (1 lb/ton), respectively, based on O.D. fiber weight. Two sets (5 sheets/set) of blanks (sheets without filler) were made, one set with the cationic starch as the only additive and the other with Percol 175 as the only additive.

Pulp was added to the Britt Jar under agitation (75% bleached hardwood kraft:25% bleached softwood kraft; 0.5% consistency, 400 Canadian Standard Freeness; pH 7.0–7.2) for 15 seconds at 1000 RPM. The weight of pulp added to the Britt Jar was adjusted to each loading level to result in a 2.5 gram unfilled or filled sheet. The Britt Jar was modified by replacing the screen with a solid plastic disk, so that when placed under agitation all the components in the jar remained contained in the jar. Albacar HO PCC (Ax-482) was loaded into the modified vaned Britt Dynamic Drainage Jar to achieve theoretical loading levels of 8%, 24% and 40%. After 30 seconds of agitating pulp and filler, if an inorganic anionic component was to be added, it was introduced at this point. At 45 seconds, this addition was followed by the addition of 1% cationic starch. If Percol 175, a cationic polyacrylamide, was the retention system of choice, then it alone was added to the agitating pulp and filler at 45 seconds into agitation. For the series of handsheets made with Percol 175, filler loading levels were adjusted to account for poorer retention. After a total of 60 seconds of agitation at 1000 RPM in the Britt Jar the contents were transferred to the deckle box of a Formax Sheet Mold where handsheets were formed using tap water. After forming, the sheets were removed from the Formax's screen and pressed once at 25 psi. The sheet was then dried using a drum dryer set at 125° C. Blank sheets (sheets without filler) were made by adding cationic starch or Percol 175 only to the modified Britt Jar at 45 seconds into agitation.

The handsheets were conditioned at constant temperature and humidity for 24 hours at 23° F. and 50% relative humidity per TAPPI procedure before testing.

Testing

The following tests were performed on all of the sheets:

| Optical | Physical | Other |
| --- | --- | --- |
| TAPPI Opacity | Grammage | % CaCO$_3$ (Texas Nuclear) |
| TAPPI Roo | Scott Bond Taber Stiffness | |

From the test results, the following values were calculated:

| Optical | Other |
| --- | --- |
| Pigment Scattering Coefficient | First Pass Retention |
| Pigment Absorption Coefficient | |
| Corrected TAPPI Opacity | |

TABLE I

| Retention Aid System | Ratio[a] Starch: Inorganic Component | Basis Weight (OD g/m$^2$) | % CaCO$_3$ | First Pass Retention (FPR) | Pigment Scattering Coefficient (cm$^2$/g) | Pigment Absorption Coefficient (cm$^2$/g) | Corrected[b] TAPPI Opacity (%) | TAPPI Brightness (%) | Internal Bond (ft-lbs) | Scott Taber Stiffness *(100 mN-m$^2$/g) |
| --- | --- | --- | --- | --- | --- | --- | --- | --- | --- | --- |
| PCC/ | 4:1 | 62.0 | 9.27 | 73.5 | 2524 | 5.27 | 86.3 | 84.8 | 106 | 4.39 |
| Cationic | 4:1 | 62.2 | 23.77 | 69.8 | 2109 | 5.48 | 90.7 | 87.5 | 70 | 3.10 |
| Starch[d] | 4:1 | 65.3 | 41.58 | 69.4 | 1866 | 4.64 | 93.2 | 90.4 | 54 | 1.43 |
|  | 10:1 | 61.9 | 9.43 | 74.7 | 2614 | 6.42 | 86.6 | 84.7 | 109 | 4.07 |
|  | 10:1 | 62.6 | 24.07 | 71.2 | 2027 | 5.67 | 90.5 | 87.5 | 66 | 3.11 |
|  | 10:1 | 64.9 | 42.61 | 70.7 | 1827 | 4.43 | 93.2 | 90.3 | 41 | 1.47 |
| silicic | 4:1 | 62.0 | 8.95 | 70.9 | 2450 | −1.10 | 85.7 | 85.8 | 100 | 4.09 |
| acid/ | 4:1 | 62.9 | 24.35 | 72.3 | 1937 | 3.11 | 90.0 | 88.2 | 64 | 3.10 |
| cationic starch | 4:1 | 67.1 | 43.64 | 74.9 | 1751 | 4.07 | 92.9 | 90.4 | 44 | 1.45 |
|  | 10:1 | 62.4 | 9.39 | 74.5 | 2513 | 5.10 | 86.3 | 84.9 | 104 | 4.23 |
|  | 10:1 | 63.4 | 24.60 | 73.7 | 1965 | 4.41 | 90.3 | 87.6 | 71 | 3.23 |
|  | 10:1 | 66.3 | 43.20 | 73.2 | 1785 | 4.40 | 93.0 | 90.3 | 46 | 1.41 |
| Percol 175 | (c) | 61.1 | 8.95 | 63.7 | 2707 | 7.49 | 87.0 | 85.4 | 85 | 3.46 |
|  |  | 63.6 | 26.63 | 62.6 | 2087 | 5.96 | 91.5 | 88.3 | 52 | 2.52 |
|  |  | 66.3 | 45.05 | 64.8 | 1881 | 5.40 | 93.8 | 90.8 | 44 | 1.04 |

[a] cationic starch content held constant at 1.0% (20 lbs/ton)
[b] corrected to 60 g/m$^2$
[c] 0.05% (1.0 lb/ton)
[d] material of Preparation A.

The first pass retention (FPR) values at all filler levels using colloidal PCC/cationic starch or colloidal silicic acid/cationic starch were superior to those achieved by the polyacrylamide system. At the 8% filler level in the sheet both ratios of the colloidal PCC/cationic starch system (1:4 and 1:10) achieved FPR values similar to those of the colloidal silicic acid/cationic starch at the 1:10 ratio, and a superior FPR value at the 1:4 ratio.

The colloidal PCC/cationic starch system is superior to colloidal silicic acid/cationic starch in pigment scattering power. Both systems are inferior to the polyacrylamide system in this property; and in opacity values.

Each of the colloidal PCC/starch and colloidal silicic acid/starch systems produces a stronger and stiffer sheet than does the polyacrylamide retention aid.

In general colloidal PCC/cationic starch (1:4) when introduced to a furnish composed of pulp and filler under high shear conditions improves the optical, strength and retention properties of the system.

A further series of experiments was run using the Britt Jar in which the shear rate, the ratio of cationic starch to aged PCC or colloidal silicic acid, and the amount of cationic starch were varied. Filler and fines retention were calculated.

GENERAL EXPERIMENTAL PROCEDURE FOR BRITT JAR RETENTION

The pulp stock used 75% Hardwood, 25% Softwood, had a Canadian Standard Freeness (CSF) of approximately 400, a consistency of 0.5%, and was adjusted to pH 7.2. The Albacar 5970 filler pigment was dispersed in deionized water at 10% solids. The anionic retention aid components were dispersed in deionized water at 0.25% solids. The Britt Jar was equipped with a 125 P screen, having 76 micron openings, and agitation was provided by a 2 inch diameter propeller rotated at 750 RPM (shear).

Test Procedure:
1. Add 500 g pulp stock, start timer
2. At 15 seconds, add filler (Albacar 5970, etc.)
3. At 30 seconds, add anionic component (colloidal PCC, silica)
4. At 45 seconds, add cationic component (starch, PAM)
5. At 60 seconds, start draining: drain off first 100 ml only
6. Filter through a tared Whatman #40 filter paper
7. Dry and weigh filter paper to determine solids in effluent
8. Ash filter paper for 4 hours at 525° C. to determine amount of filler in effluent
9. Calculate % retention Calculations:

$$\% \text{ fines retained} = \frac{[A \times B \times K] - [(H - G) - (J - I) \times \frac{A}{F}]}{(A \times B \times K)} \times 100$$

$$\% \text{ filler retained} = \frac{(D \times E) - \left[(J - I) \times \frac{A}{F}\right]}{(D \times E)} \times 100$$

where
A = total weight of stock
B = stock consistency
D = weight of PCC slurry added
E = solids of PCC slurry
F = weight of effluent
G = tare weight of filter paper
H = weight of filter paper + solids
I = crucible tare weight
J = crucible + ash weight
K = amount of fines in pulp

BRITT JAR STUDY

A. Heat aged PCC (treated with sodium hexametaphosphate)/cationic starch system (material of Preparation B)

| Conditions (see key) f (x,y,z) | % Filler Retention | % Fines Retention |
|---|---|---|
| f (0.5, 10:1, 750) | 60.32 | 63.78 |
| f (0.5, 10:1, 750) | 86.08 | 85.22 |
| f (0.5, 1:1, 750) | 72.48 | 78.36 |
| f (1.5, 1:1, 750) | 78.16 | 82.72 |
| f (0.5, 10:1, 1000) | 54.52 | 62.22 |
| f (1.5, 10:1, 1000) | 70.14 | 75.32 |
| f (0.5, 1:1, 1000) | 63.76 | 72.02 |
| f (1.5, 1:1, 1000) | 59.30 | 68.04 |
| f (0.5, 10:1, 1250) | 48.72 | 60.66 |
| f (1.5, 10:1, 1250) | 54.20 | 65.42 |
| f (0.5, 1:1, 1250) | 55.04 | 65.68 |
| f (1.5, 1:1, 1250) | 40.44 | 53.36 |

| Conditions for Given Shear Rate | Maximum % Filler Retention | Key |
|---|---|---|
| f (1.35, 10:1, 750) | 87.0 | X = % Cationic Starch |
| f (1.2, 10:1, 1000) | 73.3 | Y = Ratio Starch: Colloidal Component |
| f (1.1, 10:1, 1250) | 61.0 | Z = rpm |

BRITT JAR STUDY

B. Heat aged PCC (treated with sodium triphosphate)/cationic starch system (material of Preparation B)

| Conditions (see key) f (x,y,z) | % Filler Retention | % Fines Retention |
|---|---|---|
| f (0.5, 10:1, 750) | 75.11 | 72.33 |
| f (1.5, 10:1, 750) | 89.01 | 91.13 |
| f (0.5, 1:1, 750) | 73.11 | 75.17 |
| f (1.5, 1:1, 750) | 89.57 | 89.77 |
| f (0.5, 10:1, 1000) | 63.39 | 69.73 |
| f (1.5, 10:1, 1000) | 67.79 | 77.93 |
| f (0.5, 1:1, 1000) | 63.17 | 71.91 |
| f (1.5, 1:1, 1000) | 70.13 | 75.91 |
| f (0.5, 10:1, 1250) | 51.69 | 69.38 |
| f (1.5, 10:1, 1250) | 46.59 | 62.48 |
| f (0.5, 1:1, 1250) | 53.25 | 70.90 |
| f (1.5, 1:1, 1250) | 50.71 | 59.80 |

| Conditions for Given Shear Rate | Maximum % Filler Retention | Key |
|---|---|---|
| f (1.3, 10:1, 750) | 89.90 | X = % Cationic Starch |
| f (1.15, 1:1, 1000) | 72.90 | Y = Ratio Starch: Colloidal Component |
| f (0.95, 1:1, 1250) | 57.80 | Z = rpm |

BRITT JAR STUDY

C. Colloidal Silicic Acid/Cationic Starch System

| Conditions (see key) f (x,y,z) | % Filler Retention | % Fines Retention |
|---|---|---|
| f (0.5, 10:1, 750) | 84.05 | 88.01 |
| f (1.5, 10:1, 750) | 79.89 | 83.05 |
| f (0.5, 1:1, 750) | 68.87 | 86.19 |
| f (1.5, 1:1, 750) | 79.43 | 88.17 |
| f (0.5, 10:1, 1000) | 68.74 | 75.81 |
| f (1.5, 10:1, 1000) | 74.88 | 78.53 |
| f (.5, 1:1, 1000) | 60.20 | 69.01 |
| f (1.5, 1:1, 1000) | 81.06 | 79.37 |
| f (0.5, 10:1, 1250) | 53.43 | 64.97 |
| f (1.5, 10:1, 1250) | 69.87 | 75.37 |
| f (0.5, 1:1, 1250) | 51.53 | 53.19 |
| f (1.5, 1:1, 1250) | 82.69 | 71.23 |

| Conditions for Given Shear Rate | Maximum % Filler Retention | Key |
|---|---|---|
| f (0.95, 10:1, 750) | 89.9 | X = % Cationic Starch |
| f (1.3, 4:1, 1000) | 82.6 | Y = Ratio Starch: Colloidal Component |
| f (1.5, 1:1, 1250) | 82.7 | Z = rpm |

The superiority of the PCC/cationic starch system over Percol 175 for improving filler and fines retention was demonstrated by this experiment conducted in a Britt Jar at a shear rate of 750 rpm. Albacar 5970 was used as filler at the 20% level.

| Retention Aid | Addition Level | % Retention Filler | % Retention Fiber Fines |
|---|---|---|---|
| Percol 175 | 0.02% | 34.1 | 57.4 |
|  | 0.04% | 50.0 | 64.6 |
|  | 0.06% | 56.8 | 69.5 |
| Colloidal PCC (62 m$^2$/g)/ cationic potato starch | 0.13%/ 1.3% | 89.9 | 89.0 |

PREPARATION A

The following calcium carbonate precipitation was conducted in a 30 liter stainless steel reactor equipped with a cooling jacket, an agitator having two pitched-blade turbine impellers, a stainless steel carbonation tube to direct a carbon dioxide gas stream to the impeller and probes for monitoring the pH and temperature of the suspension.

A calcium hydroxide slurry was prepared by rapidly adding 1,550 g of pulverized reactive lime having an approximately 93% available calcium oxide content to 7.75 liters of water at 50° C. contained in the 30 liter reactor while agitating the contents at 400 RPM. After 10 minutes the slaked lime slurry reached a temperatue of 64° C. It was then diluted with 15.50 liters of water to give a final calcium hydroxide conentration of 8.8% by weight, then cooled to lower the temperature to 10° C.

An amount of active (2-hydroxyethylimino) bis(methylene)bisphosphonic acid (e.g Wayplex 61-A, Philip A. Hunt Chemical Corp.) equivalent to 0.15% and an amount of $Al_2(SO_4)_3 \cdot 18H_2O$ equivalent to 3.1% by weight of the calcium carbonate equivalent of the calcium hydroxide slurry were added to the slaked lime slurry and mixed over a period of about one minute, the agitation rate having been set at 800 RPM. The slurry was then carbonated by passing a 28 volume percent carbon dioxide in air mixture at 29 liters/minute through the slurry. The batch was carbonated over a 25 minute period to a pH of 10.0. The batch was cooled throughout the carbonation during which time the temperature increased to 15° C. The slurry was then removed from the reactor, passed through a 325 mesh screen to remove the grit present in the lime and then returned to the reactor, a small sample being retained for surface area analysis.

The screened slurry was then restabilized at pH 10.0 (by $CO_2$ gas addition) and heated to 60° C. over a period of about 15 minutes with gentle agitation. It was then maintained at pH 10.0 and 60° C. for 30 minutes after which the batch was quickly cooled to 24° C. An amount of sodium triphosphate equivalent to 3.0% based on calcium carbonate was then added and the mixture gently agitated for 10 minutes.

The above product, a highly dispersible, colloidal precipitated calcium carbonate, was characterized as follows. A portion of the heat-aged material before addition of the sodium triphosphate was treated with 3.0% (by weight of calcium carbonate) of phosphoric acid, the material dewatered, dried and subjected to surface area analysis (single-point BET $N_2$ adsorption on a Micromentics Flowsorb II instrument). Its specific surface area was 62 m$^2$/g vs 115 m$^2$/g for the material prior to heat-aging. The specific surface area of the final (triphosphate-treated) product was 64 m$^2$/g. The final product was also analyzed for particle size distribution by photon correlation spectroscopy. In this analysis, the triphosphate-treated product was diluted to 1% solids and then subjected to ultrasonic energy with a Heat Systems Model W-380 horn at an output setting of 5 for 5 minutes. This material was further diluted to about 100 ppm solids and the photon correlation spectrum measured at 90° scattering angle on a Coulter Electronics Model N4 instrument. The mean particle diameter computed from the photon correlation spectrum was 0.185 μm, the distribution width being 0.065 μm. The final product was also analyzed for surface charge by measurement of its electrophoretic mobility (zeta potential). In this analysis, the triphosphate-treated product was diluted to 1000 ppm solids with deionized water. Under these conditions the mean zeta potential was −25.1 mV as measured by the Coulter Electronics Model 440 DELSA instrument.

PREPARATION B

The equipment and process conditions were the same as Preparation A except for the following. The final slaking temperature was 73° C. and carbonation was started at 8° C. The final carbonation temperature was 17° C.

The final product (as treated with either sodium tri- or hexametaphosphate) had a specific surface area of 62 m$^2$/g (vs 112 m$^2$/g for the unaged product) and a zeta potential of −24 mV.

We claim:

1. A binder system for use in a papermaking process, said system comprising a highly dispersible, high surface area precipitated calcium carbonate and a cationic starch. Wherein the precipitated calcium carbonate has a surface area of from 10 m$^2$/g-200 m$^2$/g and the ratio of precipitated calcium carbonate: cationic starch is 2:1 to 1:20 by weight.

2. A binder system according to claim 1 wherein the cationic starch is a cationic potato starch.

3. A binder system according to claim 2 wherein the cationic potato starch has a degree of substitution of from about 0.10% to about 0.50%.

4. A binder system according to claim 3 wherein the precipitated calcium carbonate has a surface area of 50–90 m$^2$/g, a mean particle size of 0.1–0.3 μm and a zeta potential of −10 to −60 mV; the cationic starch a degree of substitution of 0.30% to 0.40% and the ratio of precipitated calcium carbonate:cationic starch is 4 by weight.

* * * * *